United States Patent [19]

Toyoda et al.

[11] Patent Number: 4,984,175
[45] Date of Patent: Jan. 8, 1991

[54] METHOD OF DIRECTLY TEACHING A HORIZONTAL ARM TYPE MULTI-ARTICULATED ROBOT AND AN APPARATUS FOR CARRYING OUT SAME

[75] Inventors: Kenichi Toyoda, Hino; Nobutoshi Torii, Hachioji; Ryo Nihei; Akihiro Terada, both of Yamanashi, all of Japan

[73] Assignee: Fanuc Ltd., Yamanashi, Japan

[21] Appl. No.: 347,965

[22] PCT Filed: Jun. 20, 1988

[86] PCT No.: PCT/JP88/00610
§ 371 Date: Feb. 10, 1989
§ 102(e) Date: Feb. 10, 1989

[87] PCT Pub. No.: WO88/10178
PCT Pub. Date: Dec. 29, 1988

[30] Foreign Application Priority Data

Jun. 19, 1987 [JP] Japan ................. 62-151421

[51] Int. Cl.⁵ ............................................. G06F 15/00
[52] U.S. Cl. .................................... 364/513; 901/3; 901/48
[58] Field of Search ................... 901/3, 4, 5, 48; 364/513; 318/568.13, 568.14

[56] References Cited

U.S. PATENT DOCUMENTS

| | | | |
|---|---|---|---|
| 4,283,764 | 8/1981 | Crum et al. | 364/193 |
| 4,300,198 | 11/1981 | Davani | 364/513 |
| 4,367,532 | 1/1983 | Crum et al. | 364/513 |
| 4,442,387 | 4/1984 | Lindbom | 364/513 |

FOREIGN PATENT DOCUMENTS

| | | |
|---|---|---|
| 61-136102 | 6/1986 | Japan |
| 61-273608 | 12/1986 | Japan |
| 62-28812 | 2/1987 | Japan |
| 62-54302 | 3/1987 | Japan |

Primary Examiner—Allen R. MacDonald
Attorney, Agent, or Firm—Armstrong, Nikaido, Marmelstein, Kobovcik, & Murray

[57] ABSTRACT

An articulated industrial robot has an articulated horizontal arm assembly which includes horizontal arms (20), a vertically movable shaft (20) mounted on the extremity of the horizontal arm assembly, and a motor for driving the vertically movable shaft. When directly teaching motions to the vertically movable shaft through a direct teaching operation by an operator, the current control unit of a motor control unit for driving the motor for driving the vertically movable shaft is disconnected from a signal line connected to a robot control unit, and a torque calculating circuit is provided for deciding a motor torque corresponding to the sum of the weight of the vertically movable shaft and the respective variable weights of an end effector attached to the lower end of the vertically movable shaft. A workpiece held by the end effector is connected to the current control unit to compensate the load torque of the vertically movable shaft with the torque of the motor so that the operator is able to carry out the direct teaching operation while substantially no load is imposed on the operator.

6 Claims, 2 Drawing Sheets

METHOD OF DIRECTLY TEACHING A HORIZONTAL ARM TYPE MULTI-ARTICULATED ROBOT AND AN APPARATUS FOR CARRYING OUT SAME

BACKGROUND OF THE INVENTION

1. Technical Field

The present invention relates to an industrial robot, more specifically, a horizontal arm type multiarticulated robot equipped with an articulated horizontal arm assembly and, more particularly, to an improved direct teaching method and apparatus for carrying out the same which enable an operator to easily and simply carry out a teaching operation when directly teaching robot motions, with respect to a vertical axis, to a horizontal arm type multi-articulated robot having an end effector for executing programmed robot actions, such as a hand or a gripper, attached to the lower end of a motor-driven vertically movable shaft joined to the extremity of a horizontal arm assembly.

2. Background Art

The desired robotic motions of the movable units of an industrial robot, such as a wrist, an arm and a swivel body, meeting the application of the industrial robot are taught beforehand to the industrial robot, and a control program for controlling the desired robotic motions is stored in a robot control unit by teaching. Generally, the operator of the robot is required to directly carry out the teaching, and when carrying out this direct teaching, the drive sources for the movable units of the robot, namely, the motors, are made inoperative. Namely, the motors are disconnected from the power source. Concretely, when teaching each movable unit, the operator manually operates the movable unit in an optimum sequence of motions to store positions and operating paths to be stored in the robot control unit. Accordingly, when teaching motions and positions of the vertically movable shaft to the horizontal arm type multi-articulated robot for carrying a workpiece, having an end effector, such as a hand or a gripper, attached to the lower end of the vertically movable shaft joined to the extremity of the horizontal arm assembly, the drive motor for driving the vertically movable shaft is made inoperative and the operator must move the vertically movable shaft, bearing the respective weights of the vertically movable shaft, the end effector, and a workpiece.

Consequently, the activity of the operator is hindered and the teaching of the desired motions and positions is difficult, and thus it is impossible to readily and simply carry out the objective teaching, because the bearing of the weight is a heavy load on the operator when teaching the horizontal arm type multiarticulated robot. No measures for directly solving such problems have been proposed.

SUMMARY OF THE INVENTION

Accordingly, an object of the present invention is to eliminate the aforesaid difficulties encountered by the horizontal arm type multi-articulated robot.

Another object of the present invention is to provide a method and an apparatus capable of readily and simply teaching an industrial robot, particularly, a horizontal arm type multi-articulated robot, with regard to the motion of the vertically movable shaft joined to the extremity of the arm of the horizontal arm type multi-articulated robot.

In accordance with one aspect of the present invention, a direct teaching method, which enables an operator to directly teach desired motions to a multiarticulated industrial robot controlled by a robot control unit according to a control program and equipped with an articulated horizontal arm assembly, by directly teaching motions to a motor-driven vertically movable shaft joined to the extremity of the horizontal arm assembly, comprises the steps of: disconnecting a signal line connecting a current control circuit of a motor controller for controlling a motor for driving the vertically movable shaft to a robot control unit when starting the direct teaching; connecting a signal line connecting the current control circuit of the motor controller to a torque calculating circuit for deciding a load torque corresponding to the sum of the weight of the vertically movable shaft and a variable load on the lower end of the vertically movable shaft to compensate for the load torque on the vertically movable shaft beforehand with the drive torque of the motor; and manually moving the vertically movable shaft in vertical directions.

In accordance with another aspect of the present invention, a multi-articulated industrial robot comprises: an articulated horizontal arm assembly controlled by a robot control unit according to a program; a vertically movable shaft provided at the lower end thereof with an end effector; a drive motor for driving the vertically movable shaft; a shaft load torque deciding means comprising a shaft weight storage means for storing the weight of the vertically movable shaft, a variable weight storage means for storing a variable weight on the lower end of the vertically movable shaft, and a weight-torque conversion means connected to the shaft weight storage means and the variable weight storage means; a first normally open switch means provided in a line interconnecting a current control means included in a drive motor controller controlling the drive motor for driving the vertically movable shaft, connected to the robot control unit, and a shaft load torque deciding means, a second normally closed switch means provided in a line interconnecting the current control means and a signal line for transmitting a position command signal and a speed command signal from the robot control unit to the drive motor controller; and a switch control means for closing the first switch means and opening the second switch means when the operator is directly teaching motions to the vertically movable shaft. When directly teaching motions to the vertically movable shaft of the multiarticulated industrial robot, the load on the vertically movable shaft is reduced substantially to zero by the motor, so that the teaching operation can be carried out easily and simply without hindrance by a load.

BRIEF DESCRIPTION OF THE DRAWINGS

The above and other objects, features and advantages of the present invention will become more apparent from the following description of preferred embodiments thereof illustrated in the accompanying drawings, wherein.

DETAILED DESCRIPTION OF THE PREFERRED EMBODIMENT

Figure 2:
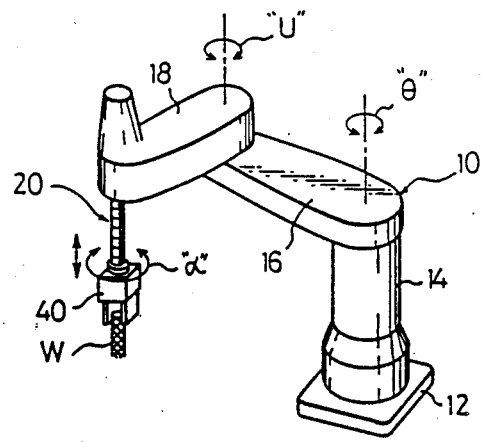
FIG. 2 is a perspective view showing the general construction of an articulated industrial robot having a horizontal arm assembly.
Figure 3:
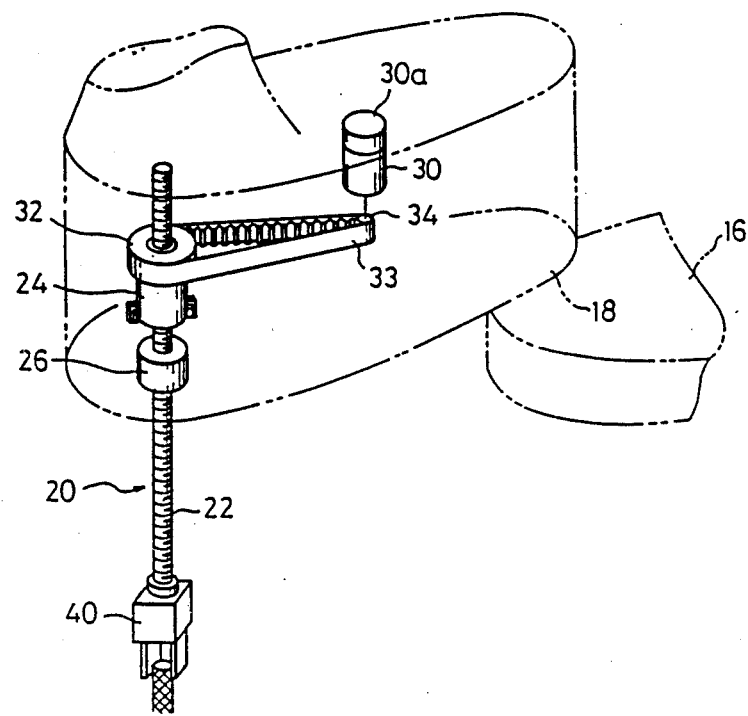
FIG. 3 is a fragmentary enlarged perspective view showing a mechanism relating to motions of the vertically movable shaft of the articulated industrial robot of FIG. 2.

Referring first to FIGS. 2 and 3, there is shown a typical external structural appearance of a multi-articulated industrial robot having an articulated horizontal arm assembly, and the details of a vertically movable shaft operating mechanism. The robot 10 has a base 12, and a rotative or stationary robot body 14 mounted upright on the base 12. A first horizontal arm 16 is extended horizontally and is joined to the upper end of the robot body 14 for turning relative to the robot body 14 about a vertical axis (0-axis). A second horizontal arm 18 is joined to the extremity of the first horizontal arm 16 for turning about another vertical axis (U-axis) parallel to the former vertical axis (θ-axis). A vertically movable shaft (hereinafter referred to simply as "vertical shaft") 20 is provided on the extremity of the second horizontal arm 18 for movement in vertical directions relative to the second horizontal arm 18. An end effector 40, such as a robot hand or a robot gripper, is attached to the lower end of the vertical shaft 20 for rotation about a vertical axis (α-axis) parallel to the U-axis. The end effector 40 is capable of gripping a workpiece W.

At this stage, the vertical shaft 20 is a ball screw type shaft 22 having an upper portion guided by a vertical guide 26 within the second horizontal arm 18 for smooth upward and downward motions and engaging a ball nut 24 capable of bearing a vertical load. The ball nut 24 is rotatable together with a pulley 32. The pulley 32 is operatively connected to a driving pulley 34 mounted on the output shaft of a vertical shaft driving motor 30 mounted in the second horizontal arm 18 via a toothed belt 33 to drive the ball nut 24 rotatively by the motor 30. The motor 30 is provided with a known rotation detector (encoder) 30a to perform an accurate positioning of the vertical shaft 20. The motor 30 drives and positions the ball screw shaft 22 through the ball nut 24. Although the drive system for vertically driving the vertical shaft 20 has been described hereinbefore, drive mechanisms for driving the first horizontal arm 16 and the second horizontal arm 18 for turning motions respectively about the θ-axis and the U-axis are similarly driven by motors are not shown.

Generally, when teaching the multi-articulated industrial robot having the horizontal arms thus constructed, by a conventional direct teaching method, in which the movable units are operated by an operator instead of previously programming robot motions to be executed by the end effector 40, i.e., the hand or the gripper, the motors for driving the movable units are disconnected from the driving current supply system, and then the end effector (the hand or gripper) 40 is manually held and moved along a desired path by an operator, to store the robot motion. In the teaching operations accompanied by the turning motions of the first horizontal arm 16, the second horizontal arm 18 and the end effector 40 respectively about the 0-axis, the U-axis and the α-axis, the operator must turn the first horizontal arm 16, the second horizontal arm 18, and the end effector 40 respectively in horizontal planes by applying a force slightly exceeding a frictional resistance against the turning motion, at the most, to the first horizontal arm 16, the second horizontal arm 18, and the end effector 40, so that such a direct teaching operation can be achieved without difficulty. Nevertheless, in a direct teaching operation requiring a vertical movement of the vertical shaft 20, the operator must carry out the teaching operation against a load including the weight of the vertical shaft 20, the weight of the end effector 40, and the weight of the workpiece W. This load is a variable load because the weight of different end effectors 40 and different workpieces W is different. Accordingly, the teaching operation requiring the vertical movement of the vertical shaft 20 is unavoidably difficult, and thus it is impossible to accurately stop the vertical shaft at target positions. To enable a simple and accurate teaching, this embodiment reduces the load on the operator when directly teaching the vertical shaft 20, by using the motor 30 for driving the vertical shaft 20.

Figure 1:
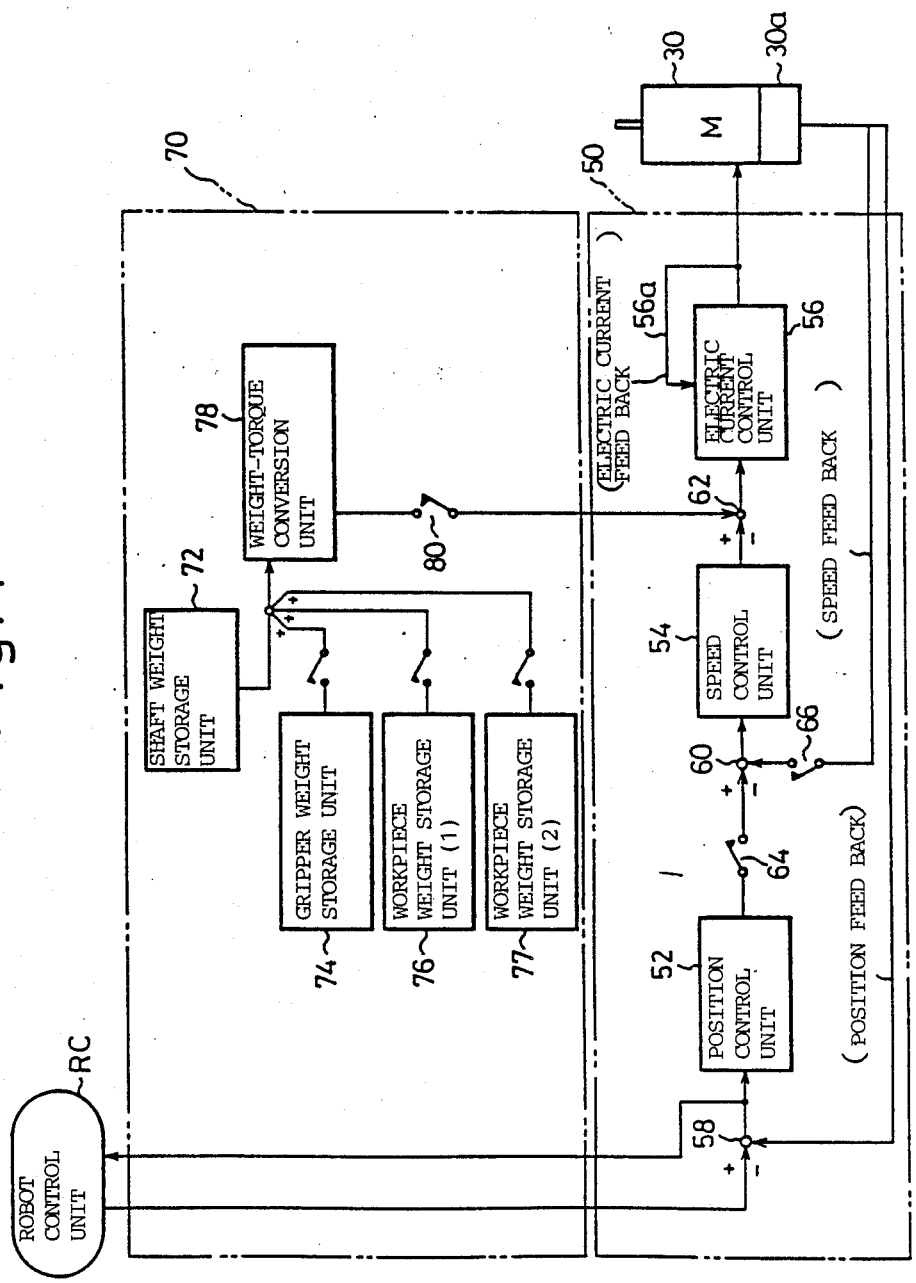
FIG. 1 is a block diagram of an apparatus for carrying out a direct teaching method in a preferred embodiment according to the present invention for directly teaching an articulated industrial robot having a horizontal arm assembly.

Indicated at 30 and 30a in FIG. 1 are the motor for driving the vertical shaft 20 and the rotation detector, respectively, shown in FIG. 3.

A motor control system for controlling the vertical shaft drive motor 30 has a motor control unit 50 for controlling the vertical shaft drive motor 30, which receives command signals and program-control signals from a robot control unit RC. The motor control unit 50 comprises a position control unit 52, a speed control unit 54, and an electric current control unit 56. The robot control unit RC applies a command signal through a summing point 58 to the position control unit 52. A position detection signal provided by the rotation detector 30a of the motor 30 is also applied to the summing point 58 through a feedback line. Another summing point 60 is provided between the position control unit 52 and the speed control unit 54. A speed command signal provided by the robot control unit RC and a position detection signal fed back from the rotation detector 30a are summed at the summing point 60 and the result is input to the speed control unit 54. A later-described summing point 62 is provided between the speed control unit 54 and the current control unit 56. A motor drive torque command signal corresponding to control signals provided by the position control unit 52 and the speed control unit 54 is fed through the summing point 62 to the current control unit 56. A positional deviation signal representing a present actual position is fed back from the summing point 58 to the robot control unit RC. The foregoing constitution is similar to that of each conventional motor driving system of an industrial robot, but in this embodiment, normally closed switches 64 and 66 are provided respectively in a line connecting the position control unit 52 to the summing point 60 and a speed feedback line connecting the rotation detector 30a of the motor 30 to the summing point 60.

The motor control system further has a teaching control unit 70. The teaching control unit 70 comprises at least three storage units, namely, a shaft weight storage unit 72 for storing the known weight of the vertical shaft 20, a gripper weight storage unit 74 for storing the respective measured weights of the changeable end effectors, and a first work weight storage unit 76 for storing the previously calculated and measured infinitely variable weight of a workpiece. The weight storage units 74 and 76 are variable weight storage units which can be set respectively for the actual weights of an end effector and a workpiece by operating push-buttons and keys. Alternately, when a second work weight storage unit 77 is provided, it may be possible to store beforehand the measured weights of many different workpieces in the second work weight storage unit 77 and to select the weight of the relevant workpiece from the weights stored in the second work weight storage unit 77 when carrying out the teaching operation. The teaching control unit 70 also has a weight-torque conversion unit 78, which calculates and converts a shaft load, namely, a weight loaded on the vertical shaft 20, into a corresponding output torque of the motor 30, taking into consideration a gear ratio of the vertical shaft driving system and necessary conditions after set weights of the shaft weight storage unit 72, the gripper weight storage unit 74 and the first work weight storage unit 76 have been decided; that is, the weight-torque conversion unit 78 has a function to calculate a torque corresponding to a shaft load and provides an electric signal corresponding to the result of the calculation of a torque corresponding to a variable weight variable depending on the variable set values of the gripper weight storage unit 74 and the work weight storage unit 76. The weight-torque conversion unit 78 may be a combination of simple computing elements or may be, for example, a potentiometer with a function to carry out a functional calculation. The computational function is expressed by $$TM = (W1 + W2 + W3) \times (L/2\pi) \times (1/I) \quad (1)$$

where W1 is the weight of the ball screw shaft 22 of the vertical shaft 20, W2 is the weight of an end effector, W3 is the weight of a workpiece, L is the lead (cm/revolution) of the ball screw shaft 22, I is the gear ratio of the belt-and-pulley mechanism, and TM is a torque (kg.cm) corresponding to the sum of W1, W2 and W3.

Accordingly, when the weight storage units are set respectively for the weights W1, W2, and W3 by the operator at the start of the teaching operation, the weight-torque conversion unit 78 provides an electric signal corresponding to a torque calculated by using the equation (1).

The weight-torque conversion unit 78 is connected through a normally open switch 80 to the summing point 62 to which the motor drive torque command signal provided by the speed control unit 54 is input. Thus, the calculated motor drive torque is supplied through the summing point 62 to the current control unit 56.

When teaching the vertical shaft 20 through the operation of the teaching control unit 70 having the aforesaid shaft load deciding function, first, the normally closed switches 64 and 66 of the motor control unit 50 are opened to disconnect the signal lines of the command system, and the normally open switch 80 is closed to connect the teaching control unit 70 to the current control unit 56 of the motor control unit 50, so that only the drive torque command signal provided by the teaching control unit 70 is supplied via the summing point 62 to the current control unit 56. Then, the current control unit 56 supplies an exciting current corresponding to the torque command signal to the motor 30, and thus the motor 30 generates a torque counterbalancing the torque corresponding to the shaft load. Since the shaft load is thus balanced by the torque of the motor 30, the operator needs only to apply a force slightly greater than the frictional resistance against the movement of the vertical shaft 20 to move the vertical shaft 20 at will for teaching. Thus, the operator can carry out the teaching operation easily and simply without exerting a force compensating for the weight W1 of the vertical shaft 20, the weight W2 of the end effector 40, and the weight W3 of the workpiece W. Movement of the vertical shaft 20 causes the rotor of the motor 30 to rotate, and thereby a counter electromotive force is generated which tends to vary the motor current. Nevertheless, the current corresponding to the torque can be constantly supplied to the motor 30 by the feedback control of the current control unit 56 through a current feedback circuit 56a.

Furthermore, since command signals provided by the robot control unit RC are intercepted during the teaching operation, the position of the vertical shaft 20 at the end of the teaching operation can be detected by the robot control unit RC from a positional deviation of the motor 30 when the position detection signal from the rotation detector 30a of the motor 30 is fed back to the position control unit 52.

As is apparent from the foregoing description of the best embodiment, according to the present invention, when directly teaching motions to a vertical shaft provided on the extremity of the horizontal arm assembly of a multi-articulated industrial robot, the respective weights of the vertical shaft, an end effector, such as a hand or a gripper, attached to the lower end of the vertical shaft, and a workpiece held by the end effector are compensated with a corresponding torque generated by a motor for driving the vertical shaft, and thus the operator needs to exert only a small force slightly exceeding a frictional resistance against the vertical movement of the vertical shaft to move the vertical shaft for direct teaching. Consequently, the vertical shaft can be simply, easily and accurately moved via desired paths to a target position, and thereby an accurate direct teaching can be achieved. That is, positions can be precisely taught to the vertical shaft. Still further, the present invention requires only a small number of additional devices and elements which can be formed by comparatively inexpensive elements and parts, which enables a functional improvement at a low cost.

We claim:

1. A method of direct teaching by an operator of a motion command to a motor-driven vertically movable shaft, which is arranged at the extremity of a horizontal articulated arm assembly of a multi-articulated robot, and is operated by a programmed command issued from a robot control unit, comprising the steps of:

storing values corresponding to a weight of said vertically movable shaft and a variable weight applied to a lower end of said vertically movable shaft;

disconnecting a signal line extending from said robot control unit to an electric current control circuit of a motor control unit for controlling a motor for driving said vertically movable shaft when starting a teaching operation by said operator;

connecting a signal line extending from a torque calculating circuit for deciding a load torque corresponding to a sum of the stored values of the weight of said vertically movable shaft and the variable weight applied to a lower end of said vertically movable shaft to said electric current control unit of said motor control unit for controlling a motor for driving said vertically movable shaft to thereby preliminarily compensate said load torque applied to said vertically movable shaft with a drive torque exerted by said motor; and, moving said vertically movable shaft up and down by a manual operation of said operator to thereby directly teach a desired motion to said shaft while substantially no load is imposed on said operator.

2. A multi-articulated industrial robot including a plurality of mutually articulated horizontal arms operated by a programmed command supplied from a robot control unit, a vertically movable shaft mounted for up and down motion on an extremity of said articulated horizontal arms and having an end effector at a lower end thereof, and a drive motor for the vertically movable shaft, comprising:

means for deciding a load torque applied to said vertically movable shaft, said deciding means comprising a shaft weight storage means for storing a weight of said vertically movable shaft, a variable weight storage means for storing a variable weight loaded on said lower end of said vertically movable shaft, and a weight-torque converting means connected to said shaft weight storage means and said variable weight storage means;

a first normally open switching means arranged between an electric current control means accommodated in a motor control unit connected to said robot control unit and controlling a motor for driving said vertically movable shaft, and said means for deciding a load torque applied to said vertically movable shaft;

a second normally closed switching means arranged between a command transmitting line for transmitting position and velocity command signals from said robot control unit to said motor control unit controlling the motor for driving said vertically movable shaft and said electric current control means; and means for effecting a switching of said first switching means from an open position thereof to a closed position as well as a switching of said second switching means from a closed position thereof to an open position when an operator carries out a direct teaching of a motion command to said vertically movable shaft, whereby the load of said vertically movable shaft is compensated by a torque exerted by said motor to permit the operator to carry out said direct teaching under a substantially no load condition.

3. A multi-articulated industrial robot according to claim 2, wherein said variable weight storage means comprises:

a first storage means for storing a weight of said end effector, and;

a second storage means for storing a weight of a workpiece held by said end effector.

4. A multi-articulated industrial robot according to claim 2, wherein said means for deciding a load torque applied to said vertically movable shaft comprises a computing circuit means for effecting a calculation and conversion of a weight value into a torque value.

5. A multi-articulated industrial robot according to claim 2, wherein said electric current control means of said motor control unit for controlling said motor for driving said vertically movable shaft comprises an electric feed-back line for feeding back an electric drive current for said motor from an output circuit of said electric drive current into said electric current control means.

6. A multi-articulated industrial robot including a plurality of mutually articulated horizontal arms operated by a programmed command supplied from a robot control unit, a vertically movable shaft mounted for up and down motion on an extremity of said articulated horizontal arms and having an end effector at a lower end thereof, and a drive motor for the vertically movable shaft, comprising:

a means for deciding a load torque applied to said vertically movable shaft, said deciding means comprising a shaft weight storage means for storing a weight of said vertically movable shaft, a variable weight storage means for storing a variable weight loaded on said lower end of said vertically movable shaft, and a weight-torque converting means connected to said shaft weight storage means and said variable weight storage means;

a first normally open switching means arranged between an electric current control means accommodated in a motor control unit connected to said robot control unit and controlling a motor for driving said vertically movable shaft, and said means for deciding to load torque applied to said vertically movable shaft;

a second normally closed switching means arranged between a command transmitting line for transmitting position and velocity command signals from said robot control unit to said motor control unit controlling the motor for driving said vertically movable shaft and said electric current control means; and means for effecting a switching of said first switching means from an open position thereof to a closed position as well as a switching of said second switching means from a closed position thereof to an open position when an operator carries out a direct teaching of a motion command to said vertically movable shaft, so that the load of said vertically movable shaft is compensated by a torque exerted by said motor to permit the operator to carry out said direct teaching under a substantially no load condition.

* * * * *